(12) United States Patent
Ribera (10) Patent No.: US 6,785,380 B2
(45) Date of Patent: Aug. 31, 2004

(54) NETWORK-CENTRIC SELF-ADMINISTERED CALL CENTER WITH INTELLIGENT MOBILE AGENT TERMINALS

(75) Inventor: John F. Ribera, Howell, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 441 days.

(21) Appl. No.: 09/871,859

(22) Filed: Jun. 1, 2001

(65) Prior Publication Data

US 2002/0181693 A1 Dec. 5, 2002

(51) Int. Cl.⁷ .......................... H04M 3/00; H04M 5/00; G06F 15/16
(52) U.S. Cl. .................. 379/265.09; 379/265.05; 709/229
(58) Field of Search ............ 379/265.02, 265.04, 379/265.05, 265.06, 265.12, 266.01; 709/201, 202, 229, 250

(56) References Cited

U.S. PATENT DOCUMENTS

| | | | |
|---|---|---|---|
| 5,841,854 A | * | 11/1998 | Schumacher et al. .. 379/265.11 |
| H1941 H | * | 2/2001 | Hoffpauir et al. ...... 379/265.13 |
| 2002/0112084 A1 | * | 8/2002 | Deen et al. .................. 709/250 |
| 2002/0174236 A1 | * | 11/2002 | Mathur et al. .............. 709/229 |

OTHER PUBLICATIONS

Jini Technology Architectural Overview, www.sun.com/jini/whitepapers/architecture.html, pp. 1–14, 2001.
"What is Jini Network Technology,?" http://www.jini.org/whatisjini.html, 1 page, 2000.

* cited by examiner

*Primary Examiner*—Benny Tieu
(74) *Attorney, Agent, or Firm*—Ryan, Mason & Lewis, LLP (57) ABSTRACT

A communication processing system includes a network having a number of agent terminals associated therewith and one or more processing elements enabled to support a distributed system deployment protocol. The distributed system deployment protocol is utilized in the system to configure one or more of the agent terminals for communication with customer terminals via the processing element(s) in order to provide designated services. The agent and customer terminals are also preferably enabled in accordance with the protocol such that configuration of these terminals to support and to utilize call center services is implementable without requiring the use of disk-based memory at the terminals.

22 Claims, 4 Drawing Sheets

NETWORK-CENTRIC SELF-ADMINISTERED CALL CENTER WITH INTELLIGENT MOBILE AGENT TERMINALS

FIELD OF THE INVENTION

The present invention relates generally to call centers and other types of communication processing systems, and more particularly to systems in which customer and agent terminals are configurable over a network.

BACKGROUND OF THE INVENTION

Call centers generally distribute calls and other types of communications, e.g., e-mails, faxes, voice messages, text messages, Internet service requests, etc. to or from available service agents, in accordance with various predetermined criteria. However, the role of the call center is broadening to address the entire relationship an enterprise has with its customers, as opposed to merely managing individual transactions. This expanded role of the call center is commonly referred to as customer relationship management (CRM).

Most conventional call centers are configured in a disk-centric manner. In other words, a given agent terminal is typically implemented as a personal computer (PC) or other type of workstation having a disk-based storage medium which stores software for running the terminal. The operating systems used on such terminals are designed with the assumption that the terminals will include such disk-based storage media. As a result, each of the terminals generally must execute a boot procedure in order to start its operation. Additional features such as audio, video and multimedia processing are also generally implemented utilizing PC-based or workstation-based application software and corresponding hardware elements configured so as to be compatible among the different terminals of the call center. The implementation of such features in the call center may require that the customer be provided with corresponding software, hardware or other processing system elements compatible with those features.

The conventional disk-centric approach described above has a number of significant drawbacks. For example, call centers configured in this conventional manner rely heavily on particular types of vendor software specific to each application. This in turn unduly restricts the range of audio, video and multimedia features that can be used to interact with customers. Other problems include excessive down time, installation difficulties, software compatibility issues, and overly burdensome interface, speed and memory requirements. As a result of these and other problems, the disk-centric approach prevents call centers from being able to evolve quickly and efficiently in a cost effective manner.

A need therefore exists for an improved technique for implementing call centers and other communication processing systems, such that the above-noted limitations of the conventional disk-centric approach are avoided.

SUMMARY OF THE INVENTION

The present invention provides a network-centric call center or other communication processing system that is implemented in a manner which avoids the need for disk-based memory at agent and customer terminals.

In accordance with one aspect of the invention, the communication processing system includes a network having a number of agent terminals associated therewith, and one or more processing elements enabled to support a distributed system deployment protocol such as the Jini protocol. The processing elements may include, for example, a web channel manager element coupled to one or more customer terminals over the Internet, and a computer-telephony integration (CTI) controller coupled to one or more customer terminals via a public switched telephone network (PSTN), a private branch exchange (PBX) switch, or other type of communication network element. The distributed system deployment protocol is utilized in the communication processing system to configure one or more of the agent terminals for communication with customer terminals via the processing element(s) in order to provide designated services. The agent and customer terminals are also preferably enabled in accordance with the protocol such that configuration of these terminals to support and to utilize call center services is implementable without requiring the use of disk-based memory at the terminals.

The distributed system deployment protocol in an illustrative embodiment comprises a discovery protocol, a join protocol and a lookup protocol. The discovery protocol allows a given one of the terminals to receive information from the system upon connection thereto so as to allow it to implement the join and lookup protocols. The join protocol allows a given one of the terminals to register with a lookup service to provide a particular type of service supported by that terminal. The lookup protocol is utilized by a given one of the terminals to identify elements of the system able to provide particular types of services.

Advantageously, a network-centric call center or other communication processing system in accordance with the present invention avoids the drawbacks associated with the conventional disk-centric approach previously described, and thus allows the implementation of substantially more efficient and effective customer relationship management (CRM). Moreover, the invention is particularly well suited for implementation in a hosted software environment in which clients interact with service providers over a network to obtain desired call center services.

DETAILED DESCRIPTION OF THE INVENTION

Although the invention will be illustrated below in conjunction with the processing of communications in an exemplary system, it is not limited to use with any particular system configuration. Those skilled in the art will recognize that the invention can be implemented using a wide variety of different communication processing system configurations, such as automatic call distribution (ACD) systems, telemarketing systems, private-branch exchange (PBX) systems, computer-telephony integration (CTI)-based systems, as well as in combinations of these and other types of call center switch configurations. A call center in accordance with the invention may be configured using any type of network infrastructure, such as, e.g., asynchronous transfer mode (ATM), local area networks, wide area networks, etc. as well as combinations of these and other networks. The term "call center" as used herein is intended to include any type of ACD system, telemarketing system or other communication system which processes calls or other service requests, including voice calls, Internet protocol (IP) communications, video calls, multimedia calls, e-mail, faxes, text chat, voice over IP or voice messages as well as various portions or combinations of these and other types of communications. The term "call" as used herein is intended to include any of the above-noted types of communications as well as portions or combinations of these and other communications. In addition, the invention is applicable to the processing of incoming communications, outgoing communications or both.

The present invention in an illustrative embodiment provides a network-centric call center that is self-administered and includes one or more intelligent mobile agent terminals. The call center in the illustrative embodiment is self-administered in that agent terminals through network-based interaction with customer terminals and other system elements configure themselves in a manner that allows processing of communications consistent with the agent and customer terminal capabilities. This in turn allows the agent terminals to be fully mobile and to be implemented without the need for disk-based media and associated preconfigured software applications. Advantageously, a network-centric call center in accordance with the present invention avoids the drawbacks associated with the conventional disk-centric approach previously described, and thus allows the implementation of substantially more efficient and effective customer relationship management (CRM).

Figure 1:
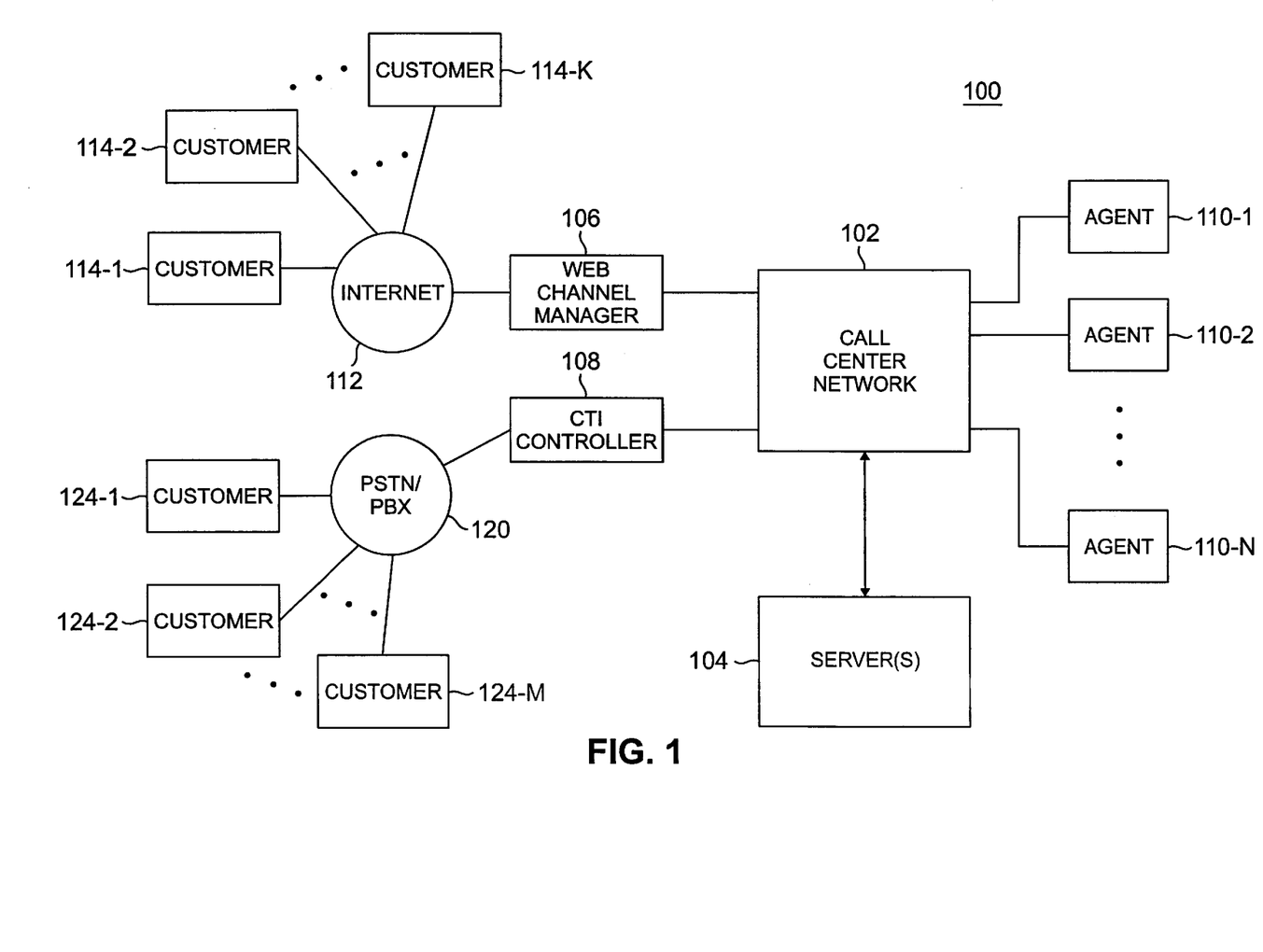
FIG. 1 is a block diagram of an exemplary communication processing system in accordance with an illustrative embodiment of the invention.

FIG. 1 shows an example communication processing system 100 in accordance with an illustrative embodiment of the invention. The system 100 includes a call center network 102 having coupled thereto a set of one or more servers 104, a web channel manager 106 and a CTI controller 108. Also coupled to the call center network 102 are agent terminals 110-1, 110-2, . . . 110-N.

The server(s) 104 stores information such as customer data, communication processing history data, configuration data, etc. It may communicate with the call center network using a private network protocol, using techniques well known in the art.

One or more of the agent terminals 110 may represent a mobile processing device such as a mobile telephone, personal digital assistant (PDA) or other processing device without a disk-based memory. One or more of the agent terminals 110 may also represent a conventional personal computer (PC) or other type of conventional agent workstation.

The web channel manager 106 is coupled to Internet 112 and controls the flow of communications between the call center network 102 and a number of customer terminals 114-1, 114-2, . . . 114-K. The web channel manager may operate in accordance with known communication protocols, such as IP and transmission control protocol (TCP).

The CTI controller 108 is coupled to a communication system network element 120 which may represent a public switched telephone network (PSTN), private branch exchange (PBX) or other network element as well as a combination of several of such elements. The CTI controller 108 controls the flow of communications between the call center network 102 and a number of customer terminals 124-1, 124-2, . . . 124-M. The CTI controller 108 may be configured using well-known conventional CTI techniques.

The call center network 102 controls the flow of communications between elements 106, 108 and the agent terminals 110.

The call center network 102, server(s) 104, web channel manager 106 and CTI controller 108 may be implemented in whole or in part using one or more elements of an otherwise conventional call center processing system, such as the DEFINITY® system commercially available from Avaya Inc. of Basking Ridge, N.J., USA. The characteristics, functions and features of such systems are well known in the art and will therefore not be further described herein. Such systems are also referred to as call center switches. Call center network 102 may thus be implemented in whole or in part using elements of a call center switch.

Like the agent terminals 110, one or more of the customer terminals 114, 124 may represent a mobile processing device such as a mobile telephone, PDA or other processing device without a disk-based memory. One or more of the customer terminals 114, 124 may also represent a PC or other type of conventional workstation or terminal.

In accordance with the invention, at least a subset of the terminals 110, 114 and 124 comprise terminals enabled to support a distributed system deployment protocol. The web channel manager 106 and CTI controller 108 are enabled as system interfaces in accordance with the distributed system deployment protocol.

In the following description of the illustrative embodiment, it will be assumed without limitation that the distributed system deployment protocol is the well-known Jini protocol of Sun Microsystems, Inc. of Palo Alto, Calif., USA, as described in, e.g., Jini Technology Architectural Overview, www.sun.com/jini/whitepapers/architecture.html, which is incorporated by reference herein. The terminals 110, 114 and 124 enabled to support the Jini protocol are referred to herein as Jini-enabled terminals. Such terminals are also referred to as clients in accordance with the Jini protocol. As is well known in the art, Jini may be viewed as a set of application programming interfaces (APIs) and network protocols permitting the development and deployment of distributed systems that are organized as a so-called federation of services. Although Jini is preferred for use in the illustrative embodiment of the invention, it should be understood that the invention can be implemented using other protocols or techniques that allow deployment of distributed systems in a network environment.

The term "network" as used in this context and elsewhere herein is intended to be construed generally to include any arrangement of interconnected network elements at least a subset of which are enabled to support a distributed system deployment protocol.

As will be described in greater detail below, the configuration of system 100 with terminals and interfaces enabled to support a distributed system deployment protocol such as Jini is a network-centric configuration that avoids the problems associated with a conventional disk-centric approach. For example, the above-noted Jini-enabled terminals do not require a boot up procedure or a disk-based memory, and are independent of application-specific software, i.e., application-specific software does not control the call center environment as it does in conventional disk-centric systems. As will be illustrated in conjunction with FIG. 2 below, the Jini-enabled terminals can be implemented using a processor, minimal memory and a network interface. Moreover, the Jini-enabled terminals can be freely disconnected from and reconnected to a network, thereby allowing full mobility for both agents and customers. As a result of these and other features of the illustrative embodiment of the invention, the communication processing system 100 exhibits improved efficiency and flexibility, reduced cost, and better CRM support.

Figure 2:
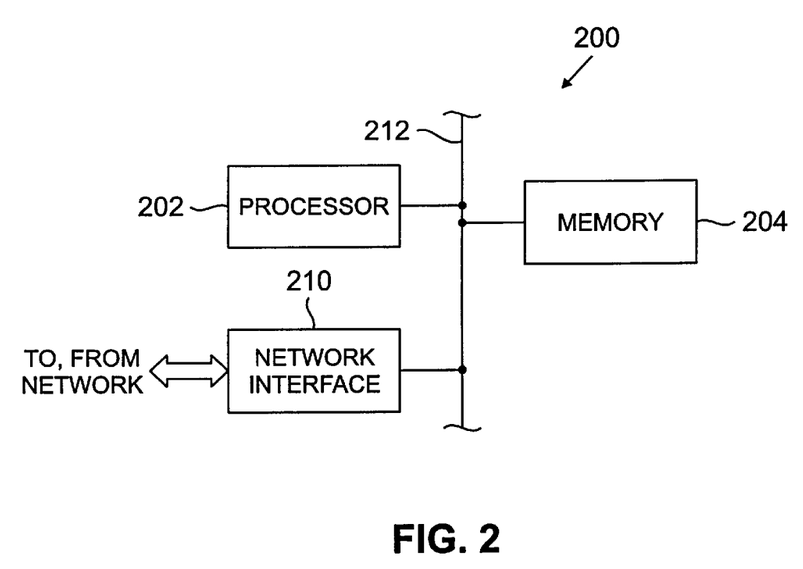
FIG. 2 is a block diagram illustrating a possible implementation of a given one of the customer or agent terminals in the FIG. 1 system.

FIG. 2 shows one possible implementation of a given one of the Jini-enabled terminals 110, 114 or 124 of FIG. 1. More particularly, a terminal 200 includes a processor 202, a memory 204 and a network interface 210, which are coupled together via a bus structure 212. Communications to and from a given network element of the system 100, such as call center network 102, Internet 112, or communication network element 120, are processed by network interface 120 in accordance with software program instructions stored in memory 204 and executed by processor 202. The terminal 200 may of course include additional elements that are omitted from the figure for simplicity and clarity of illustration, such as a display, switching elements, one or more input/output (I/O) devices, etc. Alternative terminal configurations can also be used, and such configurations will be readily apparent to those skilled in the art. Moreover, the arrangement of elements shown in FIG. 2 may be used to implement in whole or in part certain non-terminal system elements, such as elements 102, 106 and 108. For example, the elements 102, 106 and 108 may be implemented individually or collectively in the manner shown in FIG. 2.

It should be noted that a Jini-enabled system element that utilizes a service is generally referred to as a client, while a Jini-enabled system element that provides a service is generally referred to as a service provider. A given system element, such as an agent terminal or customer terminal, may be a client with regard to certain services and a service provider with regard to other services.

As noted above, the Jini protocol allows development and deployment of distributed systems that are organized as federation of services. A federation of services is any set of services that is currently available over a network, and that a client can bring together to allow it to achieve a desired goal. In the system 100, a Jini-enabled agent terminal 110 can announce itself to the network 102 and associated Jini-enabled elements 106 and 108 without the need for a conventional boot up procedure, agent login, or loading of application software. The agent terminal 110 then performs a given task by enlisting the help of services supported on the network.

The notion of federation of services is based on the Jini view that there is no central controlling authority in the system 100. Because no one service is in charge, the set of all services available on the system form a federation, i.e., a group composed of equal peers. Instead of a central authority, Jini provides a runtime infrastructure implemented in the illustrative embodiment using agent terminals 110, customer terminals 114, 124, and other Jini-enabled system elements such as web channel manager 106 and CTI controller 108. The runtime infrastructure provides a mechanism for clients to locate available services within the system via one or more lookup services to be described in greater detail below. The client and its enlisted services then perform their task independently of the Jini runtime infrastructure. If a Jini lookup service crashes, any distributed systems brought together via that lookup service before it crashed can continue their work. Jini also includes a network protocol that clients can use to find services in the absence of a lookup service. This feature can be used to allow other agents to recover customers initially lost due to a network crash or other disruption.

The above-noted Jini runtime infrastructure resides in the system 100 in the above-noted lookup services, in the clients, e.g., Jini-enabled agent and customer terminals, and in interface elements of the system such as web channel manager 106 and CTI controller 108. As noted above, lookup services are the primary organizing mechanism for Jini-based distributed systems. More particularly, when new services become available, these services register themselves with a lookup service, and when clients wish to locate a service to assist with some task, the clients consult a lookup service.

The Jini runtime infrastructure in the illustrative embodiment uses one network-level protocol, called discovery, and two object-level protocols, called join and lookup. These protocols may be viewed as subsets of the complete Jini distributed system deployment protocol. The discovery protocol enables clients and services to locate lookup services. The join protocol enables a service to register itself with a lookup service. The lookup protocol enables a client to query a lookup service for services that can help the client accomplish its tasks. The discovery, join and lookup protocols will be described below in conjunction with the respective flow diagrams of FIGS. 3, 4 and 5.

Figure 3:
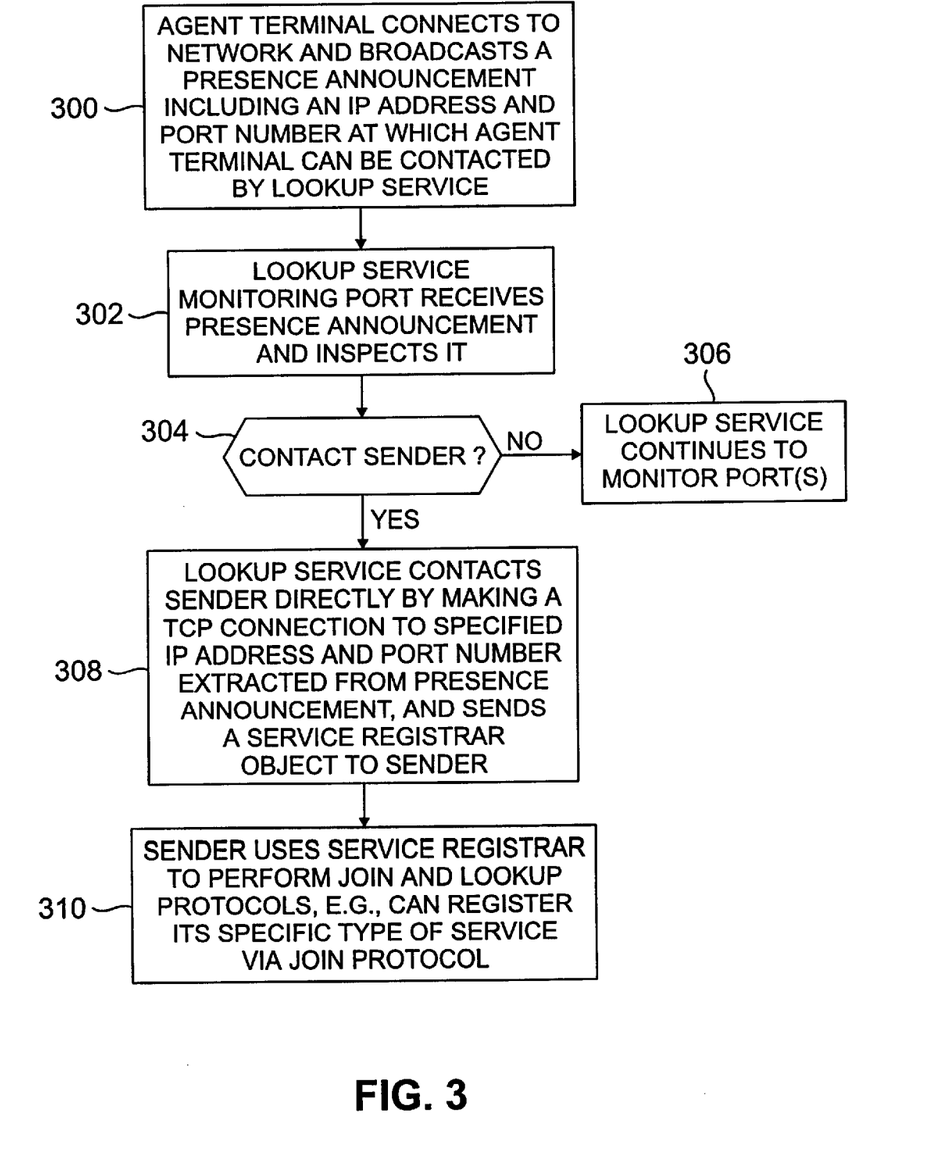
FIGS. 3, 4 and 5 are flow diagrams illustrating example discovery, join and lookup protocols that may be implemented in the FIG. 1 system as part of a distributed system deployment protocol in accordance with the invention.

FIG. 3 is a flow diagram of the discovery protocol. In step 300, an agent terminal associated with an agent offering a particular service in the system 100 connects to the call center network 102 and broadcasts a presence announcement. The presence announcement is preferably in the form of a multicast packet that is transmitted by the terminal using a specified port, although other types of announcements can also be used. The packet will generally include an IP address and a port number such that the agent terminal can be contacted by a lookup service.

Step 302 indicates that a lookup service monitoring the specified port receives the presence announcement and inspects it. The presence announcement in this embodiment includes information that enables the lookup service to determine whether or not it should contact the sender, i.e., the agent terminal referred to in step 300.

Step 304 determines whether the above-noted presence announcement information indicates that the sender should be contacted. If not, the lookup service continues to monitor one or more ports for other presence announcements as indicated in step 306. If the information indicates that the sender is to be contacted, the lookup service in step 308 contacts the sender directly, e.g., by making a TCP connection to the specified IP address and port number extracted from the presence announcement. The lookup service then sends an object, referred to herein as a service registrar, to the sender. The purpose of the service registrar object is to facilitate further communication with the lookup service. By invoking methods on this object, the sender of the presence announcement can perform join and lookup protocols on the lookup service, as indicated in step 310. For example, the agent terminal can register its specific type of service via the join protocol.

Figure 4:
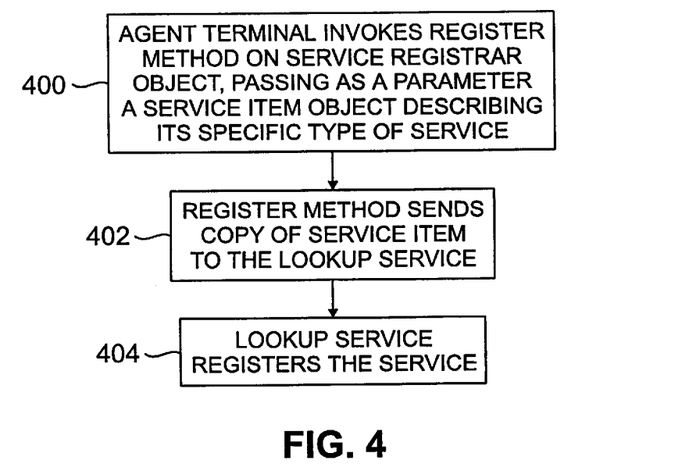

FIG. 4 is a flow diagram of the join protocol. Once an agent terminal has obtained a service registrar object via the above-described discovery protocol, it can perform the join protocol to become a part of the federation of services that are registered in the lookup service. In step 400, the agent terminal invokes a register method on the service registrar object, passing as a parameter a service item object. The service item object may be comprised of one or more objects that describe the service. The register method in step 402 sends a copy of the service item to the lookup service. The lookup service in step 404 registers the service. At this point, the agent terminal has completed the join protocol, and its service has become registered in the lookup service.

As noted previously, the service item may be comprised of multiple objects. One of these objects is a service item which clients, i.e., different agent terminals, customer terminals or other Jini-enabled system elements, can use to interact with the corresponding service. The service item can also include any number of attributes, which can be any object. Some example attributes are icons, classes that provide graphical user interfaces (GUIs) for the service, and objects that provide more information about the service.

Service objects usually implement one or more interfaces through which clients interact with the service. For example, a lookup service is a Jini service, and its service object is the service registrar. The register method invoked by an agent terminal or other Jini-enabled system element during join is declared in a service-registrar interface that is a member of a conventional netjini.core.lookup package which all service registrar objects implement. Jini-enabled system elements communicate with the lookup service through the service registrar object by invoking methods declared in the service-registrar interface. Similarly, an agent terminal may provide a service object that implements a designated type of service interface. Jini-enabled system elements can lookup and interact with an agent terminal via this designated type of service interface.

Although the discovery and join protocols are illustrated above for an agent terminal, these protocols can be implemented in a similar manner for other Jini-enabled system elements, such as customer terminals.

Figure 5:
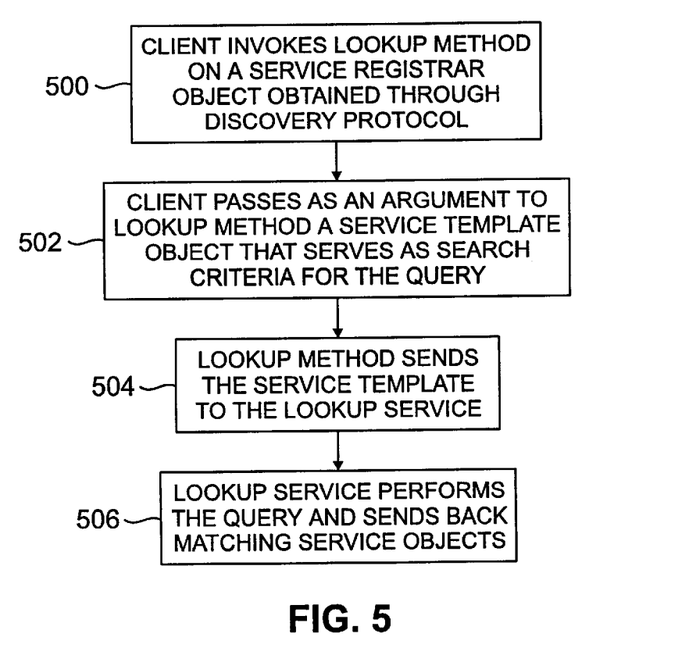

FIG. 5 is a flow diagram of the lookup protocol. Once a service has registered with a lookup service via the join protocol described above, that service is available for use by clients who query the corresponding lookup service. In order to build a distributed system of services that will work together to perform some task, a client locates and enlists the help of the individual services via the lookup protocol.

In step 500, a client invokes a lookup method on a service registrar object obtained by that client through the above-described discovery protocol. The client in step 502 passes as an argument to the lookup method a service template object that serves as search criteria for the query. The service template can include a reference to an array of class objects. These class objects indicate to the lookup service the Java type(s) of the service object desired by the client. The service template can also include a service identifier (ID), which uniquely identifies a particular service, and attributes, which generally must exactly match the attributes provided by the service provider in the service item. The service template can also contain wildcards for any of the above-noted fields. For example, a wildcard in the service ID field will match any service ID.

Step 504 indicates that the lookup method sends the service template to the lookup service. The lookup service in step 506 performs the query and sends back matching service objects if any. The client thus gets a reference to the matching service objects as the return value of the lookup method.

In the illustrative embodiment, a client typically looks up a service by Java type, usually an interface. For example, if a client needs to use a printer, it would compose a service template that includes a class object for a specified interface implemented by all printer services. The lookup service would then return one or more service objects that implemented this interface. Attributes can be included in the service template to narrow the number of matches for such a type-based search. The client would use the printer service by invoking on the service object methods declared in the specified printer service interface.

A service object can grant clients access to the service in many ways. The object can actually represent the entire service, which is downloaded to the client during lookup and then executed locally. Alternatively, the service object can serve merely as a proxy to a remote server. When the client invokes methods on the service object, it sends the requests across a network to the server, which performs the required operations associated with a given task. It is also possible that a local service object and a remote server can each perform a portion of the required operations associated with the given task.

A consequence of the Jini protocol used in the illustrative embodiment is that the network protocol used to communicate between a proxy service object and a remote server does not need to be known to the client. The network protocol may be viewed as part of the implementation of a service, and is a private matter decided upon by the developer of the service. The client can communicate with the service via this private protocol because the service provides some of its own code, e.g., the service object, to the client. The provided service object could communicate with the service via well-known conventional techniques such as Common Object Request Broker Architecture (CORBA), a custom protocol using sockets, streams or other elements, or any other suitable arrangement. The client simply does not need to concern itself with network protocols, because it can communicate with a specified interface that the service object implements, while the service object takes care of any necessary communication on the network.

Different implementations of the same service interface can use completely different implementation approaches and completely different network protocols. For example, a given service can use specialized hardware to fulfill client requests, or it can do all its work in software. Moreover, the implementation approach taken by a given service can evolve over time. The client can be sure it has a service object that understands the current implementation of the service, because the client receives the service object by way of the above-described lookup service from the service provider itself. To the client, a service looks like the specified interface, regardless of how the service is implemented.

Advantageously, a network-centric call center in accordance with the invention can allow the implementation of a CRM strategy ensuring that agents have instant access to the profile of any customer with low cost and high efficiency.

In operation, a customer can call into the system 100 using a simple Jini-enabled customer terminal such as that described in conjunction with FIG. 2. The call can be processed through and presented to a particular Jini-enabled agent terminal that has registered a call processing service in the manner described above. While the agent is communicating with the customer, a data retrieval service of the system may be accessed automatically in order to retrieve customer data. Other services including audio, video and multimedia services can be accessed by the agent and customer terminals in the manner described previously.

A more particular example of a self-administered intelligent mobile agent call center in accordance with the invention may operate as follows. A given Jini-enabled agent terminal when powered up is automatically connected to a corresponding network comprising an arrangement of interconnected network elements at least a subset of which are enabled to support the Jini protocol. An agent can log on to that terminal by simply entering a code or through another suitable technique, e.g., a retina scan or other biometric authorization mechanism. The agent terminal then announces its services to and requests services from the network. A Jini-enabled customer terminal that subsequently connects to the network can request the services of the agent terminal. Such a service request can include data specifying the how the customer terminal is configured and the services needed by the customer. The service requested by the customer may be processing of an in-bound audio or video call by an agent. The agent terminal responding to the service request can access other Jini-enabled devices over the network to obtain the services provided by such devices as needed to process the particular in-bound call. These other devices can include audio or video processing devices, storage devices, printers, cameras, etc.

Agents registered with a network-centric call center in accordance with the invention can be provided with a set of network-centric infrastructure services providing interoperability across multiple agent systems. Examples of such services include hosted services, dynamic discovery and registration of relevant participants, agent-to-agent communications, and automatic agent management features. Automatic agent management features may include, e.g., register agent name, un-register agent name, modify agent function file, search agent information file, authorize agent, un-authorize agent, create and specify agent skills based routing, list surplus agents for reassignment, etc.

As is apparent from the foregoing description, the invention is particularly well suited for implementation in a hosted software environment in which clients interact with one or more service providers over a network to obtain a wide variety of specialized services, e.g., desired call center services.

It should again be emphasized that the above-described embodiments of the invention are intended to be illustrative only. For example, the exemplary configuration of the system and terminal as shown in respective FIGS. 1 and 2 may be altered to incorporate a wide variety of different arrangements of elements to provide the processing functions described herein. In addition, as previously noted, the invention can be applied to a wide variety of communications other than voice calls or IP communications, including video calls, multimedia calls, e-mail, faxes, text chat, voice over IP, voice messages, etc. Moreover, the invention can be applied to communications over other types of networks or communication media, including non-IP networks.

It should also be noted that the invention may be implemented at least in part in the form of a machine-readable storage medium containing software which, when executed by a processor, will cause the processor to implement at least a portion of the processing functions described herein. Furthermore, a call center or other system configured in accordance with the invention may be distributed over multiple sites. For example, the processing operations described above may be performed in a remote or centralized system before a given call or other communication is delivered to an available agent at a particular local site. The particular protocols described herein in conjunction with the illustrative embodiments are by way of example only, and alternative embodiments may be configured using other protocols.

These and numerous other alternative embodiments within the scope of the following claims will be apparent to those skilled in the art.

What is claimed is:

1. A communication processing system, comprising:
   a network having a plurality of agent terminals associated therewith; and
   at least one processing element associated with the network and being enabled to support a distributed system deployment protocol, the protocol being utilizable in the system to configure a given one of the agent terminals for communication with at least one customer terminal via the processing element in order to provide a designated service, the given agent terminal also being enabled in accordance with the protocol such that configuration of the given terminal to provide the service is implementable without requiring the use of disk-based memory at the given terminal.

2. The system of claim 1 wherein the distributed system deployment protocol comprises a Jini protocol.

3. The system of claim 1 wherein the processing element comprises a web channel manager element coupled to the customer terminal over the Internet.

4. The system of claim 1 wherein the processing element comprises a computer-telephony integration controller coupled to the customer terminal via a communication network element.

5. The system of claim 1 wherein the processing element comprises at least a portion of a call center switch.

6. The system of claim 1 wherein the agent terminal comprises a mobile processing device having no disk-based memory.

7. The system of claim 1 wherein the distributed system deployment protocol comprises a discovery protocol that allows a given one of the terminals to receive information from the system upon connection thereto so as to allow it to implement at least a portion of the service.

8. The system of claim 1 wherein the distributed system deployment protocol comprises a join protocol through which a given one of the terminals can register with a lookup service to provide a particular type of service supported by the given terminal.

9. The system of claim 1 wherein the distributed system deployment protocol comprises a lookup protocol through which a given one of the terminals can identify elements of the system able to provide particular types of services.

10. An apparatus for use in a communication processing system, the apparatus comprising:
    a memory for storing information associated with a distributed system deployment protocol; and
    a processor coupled to the memory and being operative to support at least a portion of the distributed system deployment protocol, the protocol being utilizable in the system to configure a terminal for communication with at least one other entity of the system via a processing element of the system in order to provide a designated service, the terminal also being enabled in accordance with the protocol to provide the service without requiring the use of disk-based memory at the terminal.

11. The apparatus of claim 10 wherein the memory and processor are implemented in the terminal.

12. The apparatus of claim 10 wherein the memory and processor are implemented in the processing element.

13. The apparatus of claim 10 wherein the distributed system deployment protocol comprises a Jini protocol.

14. The apparatus of claim 10 wherein the processing element comprises a web channel manager element coupled to a customer terminal over the Internet.

15. The apparatus of claim 10 wherein the processing element comprises a computer-telephony integration controller coupled to a customer terminal via a communication network element.

16. The apparatus of claim 10 wherein the processing element comprises at least a portion of a call center switch.

17. The apparatus of claim 10 wherein the terminal is an agent terminal comprising a mobile processing device having no disk-based memory.

18. The apparatus of claim 10 wherein the distributed system deployment protocol comprises a discovery protocol that allows the terminal to receive information from the system upon connection thereto so as to allow it to implement at least a portion of the service.

19. The apparatus of claim 10 wherein the distributed system deployment protocol comprises a join protocol through which the terminal can register with a lookup service to provide a particular type of service supported by the terminal.

20. The apparatus of claim 10 wherein the distributed system deployment protocol comprises a lookup protocol through which the terminal can identify elements of the system able to provide particular types of services.

21. A method for use in a communication processing system having a processing element associated with a network of the system and enabled to support a distributed system deployment protocol, the method comprising the step of utilizing the protocol in the system to configure a given agent terminal for communication with at least one customer terminal via the processing element in order to provide a designated service, the given agent terminal also being enabled in accordance with the protocol such that configuration of the given agent terminal to provide the service is implementable without requiring the use of disk-based memory at the given agent terminal.

22. A machine-readable storage medium storing one or more programs for use in a communication processing system, the communication processing system comprising a processing element associated with a network of the system and enabled to support a distributed system deployment protocol, wherein the one or more programs when executed by a processor implement the step of configuring a given agent terminal for communication with at least one customer terminal via the processing element in order to provide a designated service, the given agent terminal also being enabled in accordance with the protocol such that configuration of the given agent terminal to provide the service is implementable without requiring the use of disk-based memory at the given agent terminal.

* * * * *